(12) United States Patent
Zang et al.

(10) Patent No.: US 10,613,373 B2
(45) Date of Patent: Apr. 7, 2020

(54) DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Pengcheng Zang, Beijing (CN); Ting Li, Beijing (CN); Yuanjie Xu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 15/743,145

(22) PCT Filed: Jun. 26, 2017

(86) PCT No.: PCT/CN2017/090016
§ 371 (c)(1),
(2) Date: Jan. 9, 2018

(87) PCT Pub. No.: WO2018/082318
PCT Pub. Date: May 11, 2018

(65) Prior Publication Data
US 2019/0129248 A1 May 2, 2019

(30) Foreign Application Priority Data
Nov. 2, 2016 (CN) .......................... 2016 1 0945160

(51) Int. Cl.
G02F 1/03 (2006.01)
G02B 26/00 (2006.01)
(Continued)

(52) U.S. Cl.
CPC ..... G02F 1/133553 (2013.01); G02B 6/0068 (2013.01); G02B 6/08 (2013.01); G02B 26/02 (2013.01); G02B 6/0008 (2013.01)

(58) Field of Classification Search
USPC ....... 359/261, 245, 237, 267, 290–292, 295, 359/302, 315, 317
See application file for complete search history.

(56) References Cited

U.S. PATENT DOCUMENTS 5,517,347 A * 5/1996 Sampsell ........... G02B 26/0841
359/224.1
5,640,479 A * 6/1997 Hegg ....................... G02B 6/08
359/225.1
(Continued)

FOREIGN PATENT DOCUMENTS

CN 1629700 A 6/2005
CN 2847324 Y 12/2006
(Continued)

OTHER PUBLICATIONS

International Search Report and Written Opinion for International Application No. PCT/CN2017/090016, dated Oct. 10, 2017, 10 pages.
(Continued)

Primary Examiner — Dawayne Pinkney
(74) Attorney, Agent, or Firm — Westman, Champlin & Koehler, P.A.

(57) ABSTRACT

The present disclosure provides a display panel and a display device. The display panel includes a first substrate and a second substrate, arranged opposite to each other to form a cell; a light-reflective pattern, formed on a side of the first substrate facing the second substrate; and a light guiding medium, arranged between the first substrate and the second substrate, and configured to guide incident light from the second substrate to the light-reflective pattern, so as to
(Continued)

enable the incident light to be reflected by the light-reflective pattern to form reflecting light and guide the reflecting light to exit out of the second substrate.

18 Claims, 3 Drawing Sheets

(51) Int. Cl.
*G02F 1/153* (2006.01)
*G02B 26/08* (2006.01)
*G02F 1/29* (2006.01)
*G02F 1/1335* (2006.01)
*F21V 8/00* (2006.01)
*G02B 26/02* (2006.01)
*G02B 6/08* (2006.01)

(56) References Cited

U.S. PATENT DOCUMENTS

| | | |
|---|---|---|
| 8,755,104 B2 | 6/2014 | Yao et al. |
| 2005/0134767 A1 | 6/2005 | Choi |
| 2005/0280894 A1* | 12/2005 | Hartkop ............... H04N 13/31 |
| | | 359/464 |
| 2009/0215143 A1* | 8/2009 | Monk ............... G01N 33/5438 |
| | | 435/173.1 |
| 2010/0134390 A1* | 6/2010 | Shin ...................... G02B 26/02 |
| | | 345/84 |
| 2011/0012219 A1* | 1/2011 | Lin ...................... B81C 1/00285 |
| | | 257/433 |
| 2013/0141775 A1 | 6/2013 | Yao et al. |
| 2016/0170260 A1* | 6/2016 | Wachi ...................... G02B 5/201 |
| | | 359/741 |

FOREIGN PATENT DOCUMENTS

| | | |
|---|---|---|
| CN | 201909229 U | 7/2011 |
| CN | 102707432 A | 10/2012 |
| CN | 104216177 A | 12/2014 |
| CN | 104952908 A | 9/2015 |
| CN | 106646927 A | 5/2017 |
| EP | 1267118 A1 | 12/2002 |

OTHER PUBLICATIONS

English translation of Written Opinion for International Application No. PCT/CN2017/090016, dated Oct. 10, 2017, 2 pages.
Second Office Action, including Search Report, for Chinese Patent Application No. 201610945160.2, dated May 21, 2019, 13 pages.

\* cited by examiner

DISPLAY PANEL AND DISPLAY DEVICE

CROSS-REFERENCE TO RELATED APPLICATION

The present application is the U.S. national phase of PCT Application No. PCT/CN2017/090016, filed on Jun. 26, 2017, which claims a priority of the Chinese Patent Application No. 201610945160.2 filed on Nov. 2, 2016, the disclosures of which are incorporated in their entirety by reference herein.

TECHNICAL FIELD

The present disclosure relates to a field of display technology, and in particular to a display panel and a display device.

BACKGROUND

In a related art, a display panel based on a reflective light source includes two types of display technologies: liquid crystal display technology and electrophoretic display technology.

In the liquid crystal display technology, incident light enters an upper substrate through a polarization plate, arrives at a reflective layer through a liquid crystal layer, and exits through the liquid crystal layer and the polarization plate after being reflected by the reflective layer. Accordingly, the amount of exit light is mainly controlled by rotation of liquid crystal molecules. Since there is relatively significant loss of light after the light travels through the polarizing panel and the liquid crystal, a light transmittance is relatively low, and many problems still remain in the application of such liquid crystal display technology to a flexible liquid crystal display, such as reduction in display brightness or a disadvantage for bending of the flexible LCD due to the polarizing plate, and hence it is difficult to be implemented in a product.

In the electrophoretic display technology, a reflection of Light is mainly realized by arranging a capsule filled with particles between display panels and applying a voltage to control rotation of particles in the capsule. Currently, color display implemented by adopting the electrophoretic display technology remains at a theoretical stage, and faces many difficulties in an actual practical application, such as poor uniformity or low mechanical strength of the capsule, or relatively serious light scattering from a surface of the capsule.

In view of this, it is desired to provide a reflective display solution that is practical and of relatively high luminous performance.

SUMMARY

The present disclosure aims to provide a brand new reflection display solution, which is not only capable of increasing a light transmittance of a display panel, but also being relatively easy to implement, and has relatively high practicability.

To achieve the above-mentioned aim, and in an aspect, a display panel is provided, including: a first substrate and a second substrate, arranged opposite to each other to form a cell; a light-reflective pattern, formed on a side of the first substrate facing the second substrate; and a light guiding medium, arranged between the first substrate and the second substrate, and configured to guide incident light from the second substrate to the light-reflective pattern, so as to enable the incident light to be reflected by the light-reflective pattern to form reflecting light and guide the reflecting light to exit out of the second substrate.

Optionally, one end of the light guiding medium is secured within a display area of the second substrate, and the other end of the light guiding medium is secured onto the light-reflective pattern of the first substrate.

Optionally, the light guiding medium arranged between the first substrate and the second substrate includes a plurality of light guiding media, with an identical distance between any two adjacent light guiding media.

Optionally, a reflectivity of the light-reflective pattern changes under an effect of an electrical field or a magnetic field. Further, the light-reflectivity of the reflective pattern varies with a magnitude of a voltage applied to the light-reflective pattern.

Optionally, the first substrate further includes a data line, a gate line, and a thin film transistor; the data line is connected to an input terminal of the thin film transistor and configured to receive a data signal; the gate line is connected to a control terminal of the thin film transistor and configured to receive a scan signal; and the light-reflective pattern is connected to an output terminal of the thin film transistor.

Further, the first substrate further comprises a plurality of date lines, a plurality of gate lines and a plurality of thin film transistor, and a plurality of light-reflective patterns; and the plurality of thin film transistors is arranged in one-to-one correspondence with the plurality of light-reflective patterns, each data line is connected to an input terminal of at least one thin film transistor, each gate line is connected to a control terminal of at least one thin film transistor, and each light-reflective pattern is connected to an output terminal of its corresponding thin film transistor.

Further, the plurality of light-reflective patterns is arranged in a matrix, two columns of light-reflective patterns are arranged between two adjacent data lines, and two gate lines are arranged between two rows of light-reflective patterns.

Optionally, the light-reflective pattern is made of a conductive material. Further, the light-reflective pattern is made of at least one of vanadium dioxide, tungsten oxide, nickel oxide, and conductive polyethylene.

Optionally, the light guiding medium includes an optical fiber.

Further, the optical fiber includes a fiber core and a clad surrounding the fiber core, and a refractivity of the clad is smaller than that of the fiber core.

Optionally, the optic fiber further comprises a coating layer on the clad.

Optionally, the optical fiber has a diameter not greater than 15 micrometers.

Optionally, the display panel further includes a color filter, wherein the reflecting light exits out of the display panel after passing through the color filter.

Optionally, the color filter is arranged between the light-reflective pattern and the light guiding medium.

Optionally, the color filter is arranged on the second substrate.

Optionally, the display panel includes a flexible display panel and the light guiding medium is bendable along with the first substrate and the second substrate.

In another aspect, the present disclosure provides a display device including any one of the above-mentioned display panels.

The above-mentioned technical scheme of the present disclosure has following beneficial effects: light guiding medium is arranged between the substrates of the display panel, such that incident light reaches the light-reflective pattern with relatively low transmission loss to implement the reflection of the light. Hence, not only the amount of exit light is relatively high, but also the structure is relatively simple and much easier to implement, and has high practicability.

DETAILED DESCRIPTION

In order to make technical problems to be solved by the present invention, technical schemes and advantages more clear, the present invention will be described in detail in conjunction with accompanying drawings and specific embodiments hereinafter.

The present disclosure provides a technical solution of a new reflective display. In an aspect, as shown in FIG. 1, the present disclosure provides a display panel which includes a first substrate 1 and a second substrate 2 arranged opposite to each other to form a cell, a light-reflective pattern 11 formed on a side of the first substrate 1 facing the second substrate 2, and a light guiding medium 3 arranged between the first substrate and the second substrate to and configured to guide incident light from the second substrate to the light-reflective pattern 11 (also called "reflective pattern" that is able to reflect the incident light), so as to enable the incident light to be reflected by the light-reflective pattern to form reflecting light and guide the reflecting light to exit out of the second substrate.

According to an embodiment of the present disclosure, the light guiding medium is arranged between two substrates of the display panel, such that the incident light of the display panel is guided by the light guiding medium to reach the light-reflective pattern and is reflected by the light-reflective pattern, and then is guided by the light guiding medium to exit out of the display panel, so as to display a picture. In comparison to a traditional liquid crystal reflection display panel, light loss of the light guiding medium is smaller than that of a liquid crystal layer, thereby increasing the light transmittance of the display panel. In another aspect, compared with an electrophoretic display panel, the display panel of the present disclosure is simpler in structure and easier to implement, and therefore has high practicability.

Figure 1:
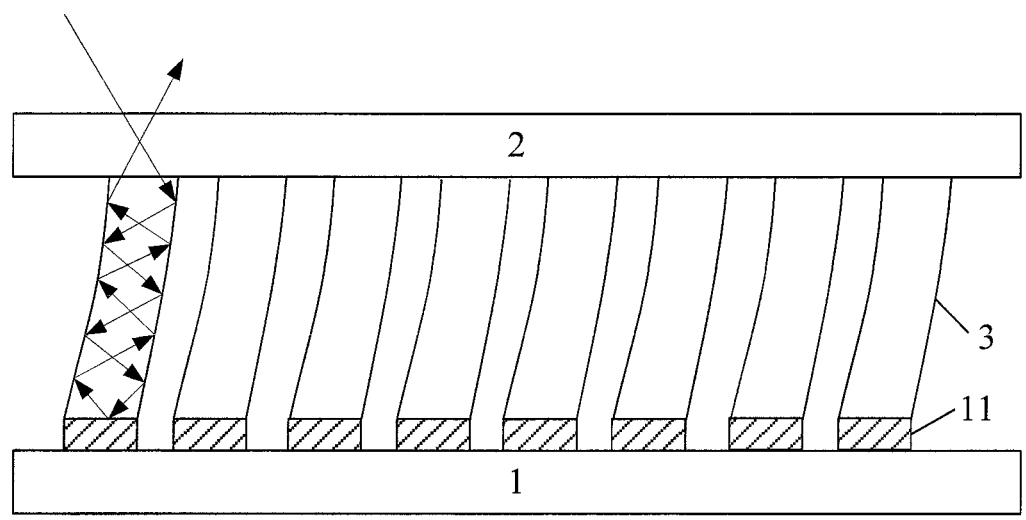
FIG. 1 is a structural schematic diagram of a display panel of the present disclosure.

Further, referring to FIG. 1, according to the embodiment, there may be a plurality of light guiding media. One end of each of the plurality of light guiding media is secured within a display area of the second substrate 2, and the other end is secured onto the light-reflective pattern 11 of the first substrate 1, such that the incident light directly reaches the light-reflective pattern 11 from the light guiding medium 3 and is reflected by the light-reflective pattern 11, and a reflection pattern exits out of the display area to display a picture. Distance between any two adjacent light guiding media may be the same or different.

Figure 2:
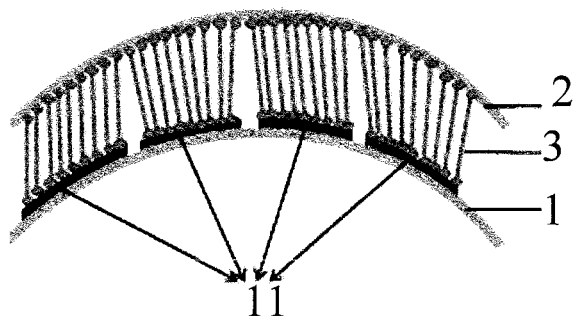
FIG. 2 is a structural schematic diagram of a display panel of the present disclosure, where the display panel is a flexible display panel in a bent state.
Figure 3:
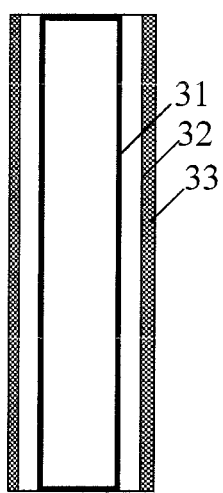
FIG. 3 is a structural schematic diagram of a light guiding medium of a display panel of the present disclosure.

In practice, the light guiding medium of the present disclosure may include an optic fiber that is made of a flexible material, and therefore the reflection solution of the embodiment may also be suitable for a flexible display panel. Referring to FIG. 2, the optic fiber 3 may be bendable along with the first substrate 1 and the second substrate 2 of the display panel. Since light may only be transmitted within the optic fiber 3, no matter how bendable the optic fiber is, the incident light is able to eventually reach the light-reflective pattern 11 and be reflected by the light-reflective pattern 11, and then pass through the light guiding fiber 3 and exit out of the display area of the second substrate 2, so as to implement a normal display.

In practice, the optic fiber of an embodiment, a specific structure of which is shown in FIG. 2, has a diameter not greater than 15 micrometers. The optic fiber includes a fiber core 31, a clad 3 surrounding the fiber core 31. To reduce light transmission loss, a refractivity of the fiber core 31 is greater than that of the clad 32, where the clad 32 may provide protection and support to light.

In addition, as a preferred solution according to the embodiment, a coating layer 33 may be arranged on the clad 32, wherein the coating layer 33 may further prevent leakage of light from inside to outside of the fiber core 31, so as to reduce light loss.

Optionally, an optical property (such as a reflectivity) of the light-reflective pattern may change under an effect of an electrical field or a magnetic field. For instance, the reflectivity of the light-reflective pattern varies with a magnitude of a voltage applied to the light-reflective pattern. In addition, the light-reflective pattern according to the embodiment may further include a conductive light-reflective pattern (for example, to be made of at least one of vanadium dioxide, tungsten oxide, nickel oxide, and conductive polyethylene). Light-reflective pattern may also be made of an electrochromic or a magnetochromic material.

Figure 4:
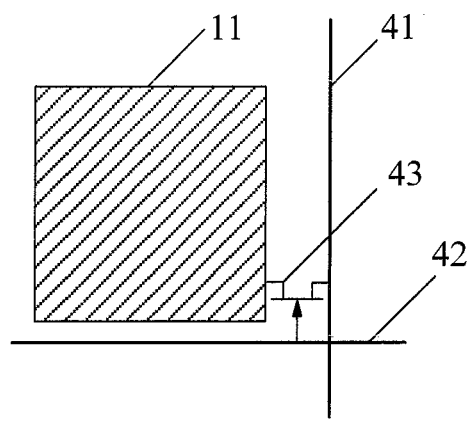
FIG. 4 and FIG. 5 are each a schematic diagram of a light-reflective pattern driven by a voltage of the display panel of the present disclosure.

As shown in FIG. 4, the first substrate according to the embodiment further includes a data line 41, a gate line 42, and a thin film transistor 43. The data line 41 is connected to an input terminal of the thin film transistor 43 and configured to receive a data signal; the gate line 42 is connected to a control terminal of the thin film transistor 43 and configured to receive a scan signal. The light-reflective pattern 11 is connected to an output terminal of the thin film transistor 43.

The data signal is configured to apply a voltage to the light-reflective pattern 11. Under control of the scan signal, the thin film transistor 43 is turned on, the data signal reaches the light-reflective pattern 11, and the reflectivity of the light-reflective pattern 11 changes.

According to the above-mentioned technical solution, by reasonably controlling a voltage magnitude of the data signal and a driving time slot of the scan signal in the present embodiment, the amount of the light that exits out of the display panel is able to be adjusted purposefully, and accordingly brightness on a display picture is adjustable.

Figure 5:
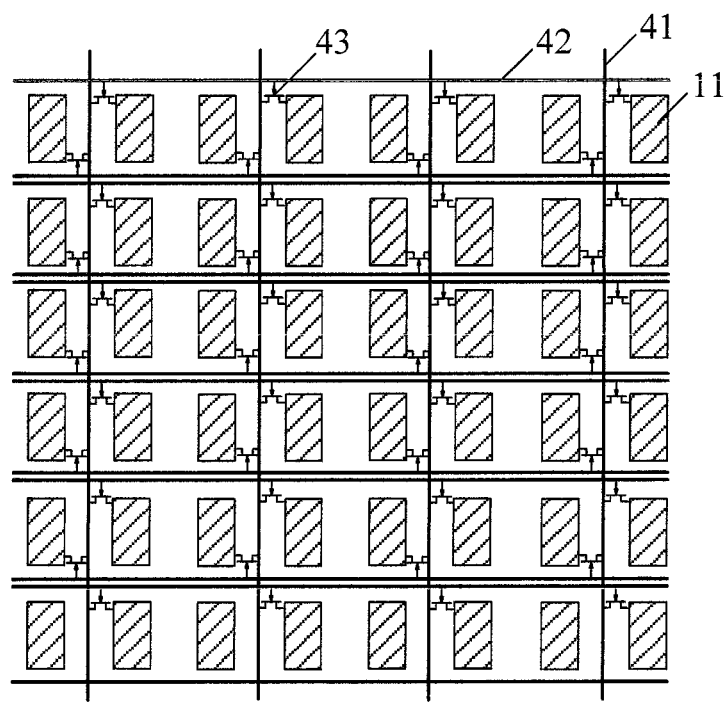

In practice, the first substrate includes a plurality of light-reflective patterns, a plurality of date lines, a plurality of gate lines and a plurality of thin film transistor. In an illustrative example, as shown in FIG. 5, the plurality of light-reflective patterns 11, arranged in a matrix, arranged in one-to-one correspondence with the plurality of thin film transistors 43; and each of the data lines 41 is connected to an input terminal of at least one of the thin film transistors 43, each of the gate lines 42 is connected to a control terminal of at least one of the thin film transistors 43, and each of the light-reflective patterns 11 is connected to an output terminal of its corresponding thin film transistor 43.

In addition, the display panel of this embodiment may further include a color filter for color display, and the light reflected by the light-reflective pattern 11 exits out of the display panel after passing through the color filter.

Figure 6:
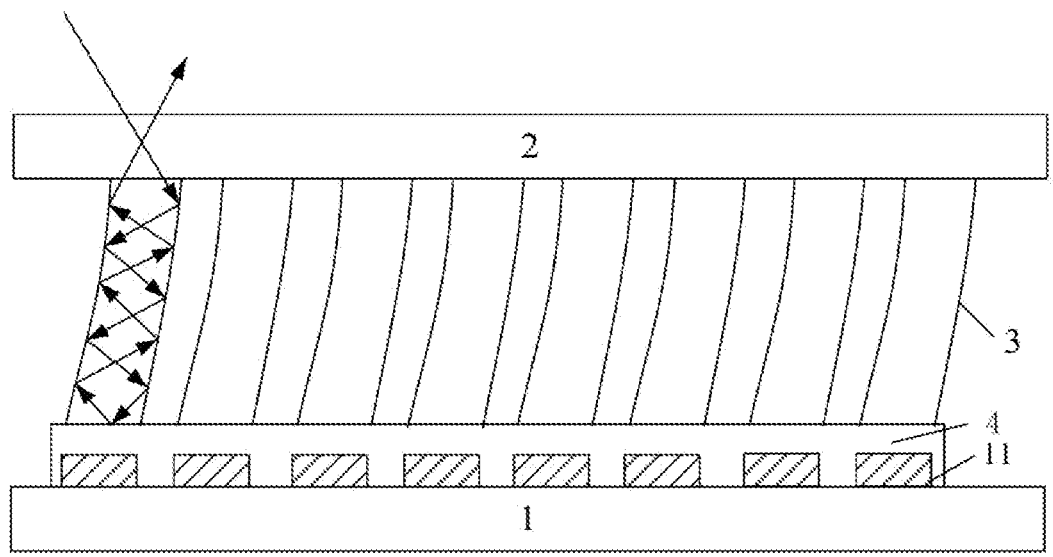
FIG. 6 and FIG. 7 are each a schematic diagram of a display panel provided with a color filter of the present disclosure.

In an illustrative example, as shown in FIG. 6, the color filter 4 of some embodiment may be arranged above the light-reflective pattern 11 of the first substrate 1, that is, the light guiding medium 3 is spaced apart from the reflection pattern by the color filter 4. Or, as shown in FIG. 7, the color filter 4 may be directly arranged on the second substrate 2.

Figure 7:
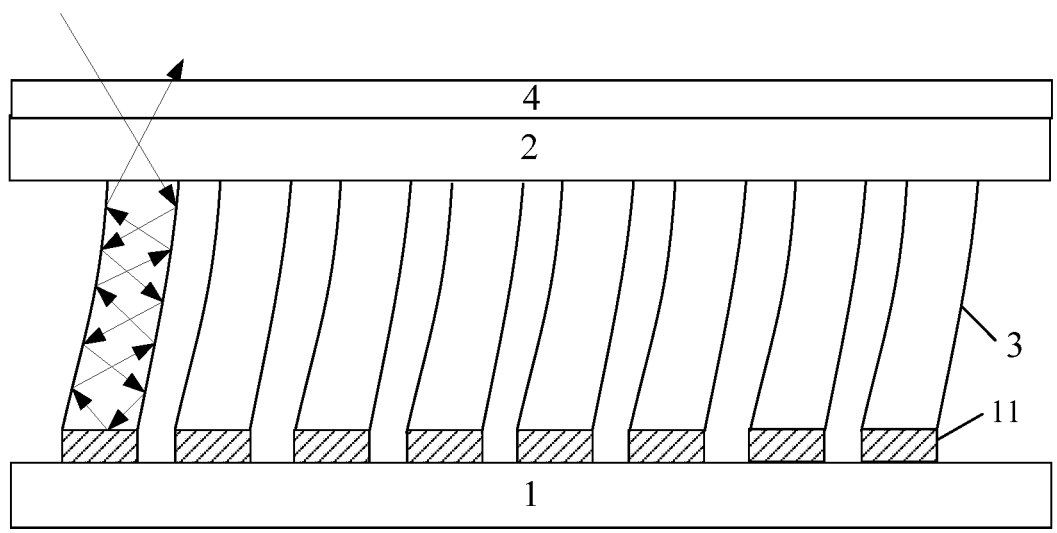

It should be noted that, the arrangement of the color filter of the present disclosure is not limited to what is shown in FIG. 6 and FIG. 7. Any arrangement of the color filter should fall within the scope of protection of the present disclosure as long as the reflecting light exits out of the display panel after passing through the color filter.

In another aspect, the present disclosure also provides a display device including any one of the display panels described above. Due to the design of the display panel, the display device of this embodiment has a simple structure and relatively low production cost.

In addition, the display panel of the present disclosure may adopt a flexible display panel, and no matter how the flexible display panel is bent, light exiting out of the display area is not affected. Accordingly, the display device of the present disclosure is more stable, which is not otherwise achievable with an existing product.

The foregoing merely describes the preferred embodiments of the present disclosure. It should be pointed out that, various modifications and variations may be made by those skilled in the art without deviating from the spirit and scope of the present disclosure, and these modifications and variations should be considered within the scope of the present disclosure.

What is claimed is:

1. A display panel, comprising:
   a first substrate and a second substrate, arranged parallel to each other and opposite to each other to form a cell;
   a light-reflective pattern, formed on a side of the first substrate facing the second substrate, formed on the first substrate directly, and an upper surface of the light reflective pattern being parallel to the first substrate; and
   a light guiding medium, arranged between the first substrate and the second substrate and in a direct contact with the light-reflective pattern, and configured to guide incident light from the second substrate to the light-reflective pattern, so as to enable the incident light to be reflected by the light-reflective pattern to form reflecting light and guide the reflecting light to exit out of the second substrate,
   wherein the display panel comprises a flexible display panel and the light guiding medium is bendable along with the first substrate and the second substrate,
   wherein the incident light is continually scattered and reflected along the bended light guiding medium,
   wherein there are a plurality of light-reflective patterns arranged separately and a plurality of light guide media arranged separately.

2. The display panel according to claim 1, wherein:
   one end of the light guiding medium is secured within a display area of the second substrate, and the other end of the light guiding medium is secured onto the light-reflective pattern of the first substrate.

3. The display panel according to claim 1, wherein the light guiding medium arranged between the first substrate and the second substrate comprises a plurality of light guiding media, with an identical distance between any two adjacent light guiding media.

4. The display panel according to claim 1, wherein a reflectivity of the light-reflective pattern changes under an effect of an electrical field or a magnetic field.

5. The display panel according to claim 4, wherein the light-reflectivity of the reflective pattern varies with a magnitude of a voltage applied to the light-reflective pattern.

6. The display panel according to claim 1, wherein:
   the first substrate further comprises a data line, a gate line, and a thin film transistor;
   the data line is connected to an input terminal of the thin film transistor and configured to receive a data signal;
   the gate line is connected to a control terminal of the thin film transistor and configured to receive a scan signal; and
   the light-reflective pattern is connected to an output terminal of the thin film transistor.

7. The display panel according to claim 6, wherein:
   the first substrate further comprises a plurality of date lines, a plurality of gate lines and a plurality of thin film transistor, and a plurality of light-reflective patterns; and
   the plurality of thin film transistors is arranged in one-to-one correspondence with the plurality of light-reflective patterns, each data line is connected to an input terminal of at least one thin film transistor, each gate line is connected to a control terminal of at least one thin film transistor, and each light-reflective pattern is connected to an output terminal of its corresponding thin film transistor.

8. The display panel according to claim 7, wherein the plurality of light-reflective patterns is arranged in a matrix, two columns of light-reflective patterns are arranged between two adjacent data lines, and two gate lines are arranged between two rows of light-reflective patterns.

9. The display panel according to claim 1, wherein the light-reflective pattern is made of a conductive material.

10. The display panel of claim 9, wherein:
    the light-reflective pattern is made of at least one of vanadium dioxide, tungsten oxide, nickel oxide, and conductive polyethylene.

11. The display panel of claim 1, wherein the light guiding medium comprises an optical fiber.

12. The display panel according to claim 11, wherein:
    the optical fiber comprises a fiber core and a clad surrounding the fiber core, and a refractivity of the clad is smaller than that of the fiber core.

13. The display panel according to claim 12, wherein the optic fiber further comprises a coating layer on the clad.

14. The display panel according to claim 1, wherein the optical fiber has a diameter not greater than 15 micrometers.

15. The display panel according to claim 1, further comprising:
    a color filter, wherein the reflecting light exits out of the display panel after passing through the color filter.

16. The display panel according to claim 15, wherein the color filter is arranged between the light-reflective pattern and the light guiding medium.

17. The display panel according to claim 15, wherein the color filter is arranged on the second substrate.

18. A display device, comprising the display panel according to claim 1.

\* \* \* \* \*